United States Patent
Marinelli et al.

(10) Patent No.: US 8,930,769 B2
(45) Date of Patent: Jan. 6, 2015

(54) MANAGING OPERATING SYSTEM DEPLOYMENT FAILURE

(75) Inventors: Claudio Marinelli, Latina (IT); Antonio Perrone, Rome (IT); Luigi Pichetti, Rome (IT); Randa Salem, Rome (IT)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 13/173,150

(22) Filed: Jun. 30, 2011

(65) Prior Publication Data

US 2012/0042195 A1 Feb. 16, 2012

(30) Foreign Application Priority Data

Aug. 13, 2010 (EP) .................................. 10172796

(51) Int. Cl.
*G06F 11/00* (2006.01)
*G06F 11/07* (2006.01)

(52) U.S. Cl.
CPC ........ *G06F 11/0712* (2013.01); *G06F 11/0757* (2013.01); *G06F 11/0793* (2013.01)
USPC ........................................... 714/38.14; 713/2

(58) Field of Classification Search
None
See application file for complete search history.

(56) References Cited

U.S. PATENT DOCUMENTS

| | | | |
|---|---|---|---|
| 6,587,966 B1 * | 7/2003 | Chaiken et al. ................ | 714/34 |
| 6,865,737 B1 | 3/2005 | Lucas | |
| 7,350,201 B2 | 3/2008 | Ferri | |
| 7,421,688 B1 * | 9/2008 | Righi et al. .................... | 717/172 |
| 7,487,343 B1 | 2/2009 | Insley et al. | |
| 7,543,277 B1 | 6/2009 | Righi et al. | |
| 7,546,448 B2 | 6/2009 | Dickens | |
| 8,046,743 B1 * | 10/2011 | Righi et al. .................... | 717/125 |
| 2006/0195839 A1 | 8/2006 | Lin | |
| 2006/0253555 A1 | 11/2006 | Leung | |
| 2008/0046708 A1 * | 2/2008 | Fitzgerald et al. ............. | 713/2 |
| 2008/0077935 A1 | 3/2008 | Breiter et al. | |
| 2008/0244337 A1 | 10/2008 | Breiter et al. | |
| 2009/0013168 A1 | 1/2009 | Kalman et al. | |
| 2012/0023322 A1 * | 1/2012 | Landry et al. ................. | 713/2 |

FOREIGN PATENT DOCUMENTS

CN 101135984 A 3/2008

OTHER PUBLICATIONS

B.Srikanth, D.Kirubakaran, N.Siddharth, Sudip Sanyal; Software Installation on a Huge Heterogeneous Network Using Mobile Agents, Indian Institute of Information Technology, Allahabad, India, 211012, 6th IEEE/ACIS International Conference on Computer and Information Science (ICIS 2007).

* cited by examiner

*Primary Examiner* — Christopher McCarthy
(74) *Attorney, Agent, or Firm* — Steven L. Nichols; Van Cott, Bagley, Cornwall & McCarthy P.C.

(57) ABSTRACT

A method for managing operating system deployment failure includes, with an operating system deployment server, running an operating system deployment process that comprises running a progressive hardware discovery process of a target machine to which an operating system is deployed, the discovery process to capture inventory information related to the target machine, monitoring the operating system deployment to detect failure in a pre-operating system environment running on the target machine for a predefined period of time, and executing a remediation action in response to generation of a failure code during the period of time, the remediation action related to a Basic Input Output System (BIOS) of the target machine.

20 Claims, 5 Drawing Sheets

MANAGING OPERATING SYSTEM DEPLOYMENT FAILURE

CROSS-REFERENCE TO RELATED APPLICATIONS

The present application claims priority pursuant to 35 U.S.C. §119(a) from European Patent Application No. 10172796.4, filed on Aug. 13, 2010, which is incorporated herein by reference in its entirety.

BACKGROUND

Aspects of the present invention relate in general to computer system management and in particular to a method and a system of managing failures in software deployments. One common type of software deployment is an operating system deployment. An operating system deployment is the process whereby an operating system is installed on a computing machine. The machine to which an operating system is being deployed is often referred to as the target machine. The process of deploying an operating system to a target machine involves a number of management tasks that are performed in a specific order until the software installation is completed. However, in the process of deploying the operating system, errors or failures may occur. Errors that occur during the execution of a given task may impact the execution of other tasks. Managing failures or errors during an operating system deployment to a target machine is can be problematic as the target machine has limited capabilities until the deployment of the operating system is complete.

BRIEF SUMMARY

A method for managing operating system deployment failure includes, with an operating system deployment server, running an operating system deployment process that comprises running a progressive hardware discovery process of a target machine to which an operating system is deployed, the discovery process to capture inventory information related to the target machine, with the server, monitoring the operating system deployment to detect failure in a pre-operating system environment running on the target machine for a predefined period of time, and with the server, executing a remediation action in response to generation of a failure code during the period of time, the remediation action related to a Basic Input Output System (BIOS) of the target machine.

A server system includes a processor and a memory communicatively coupled to the processor. The processor is configured to execute an operating system deployment process that comprises running a progressive hardware discovery process of a target machine to which an operating system is deployed, the discovery process to capture inventory information related to the target machine, monitor the operating system deployment to detect failure in a pre-operating system environment running on the target machine for a predefined period of time, and execute a remediation action in response to generation of a failure code during the period of time, the remediation action related to a Basic Input Output System (BIOS) of the target machine.

A computer program product for managing failure during operating system deployment, the computer program product includes a computer readable storage medium having computer readable code embodied therewith. The computer readable program code includes computer readable program code configured to execute an operating system deployment process that comprises running a progressive hardware discovery process of a target machine to which an operating system is deployed, the discovery process to capture inventory information related to the target machine, computer readable program code configured to monitor the operating system deployment to detect failure in a pre-operating system environment running on the target machine for a predefined period of time, and computer readable program code configured to execute a remediation action in response to generation of a failure code during the period of time, the remediation action related to a Basic Input Output System (BIOS) of the target machine.

A method for managing operating system deployment failure includes, with an operating system deployment server, running an operating system deployment process that comprises running a progressive hardware discovery process of a target machine to which an operating system is deployed, the discovery process to capture inventory information related to the target machine, monitoring the operating system deployment to detect failure in a pre-operating system environment running on the target machine for a predefined period of time, and in response to detecting a failure, flashing a Basic Input Output System (BIOS) of the target machine with a new BIOS version, the new BIOS version obtained by using a failure code associated with the failure and the inventory information to lookup the new BIOS version in a remediation repository comprising a number of BIOS versions.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
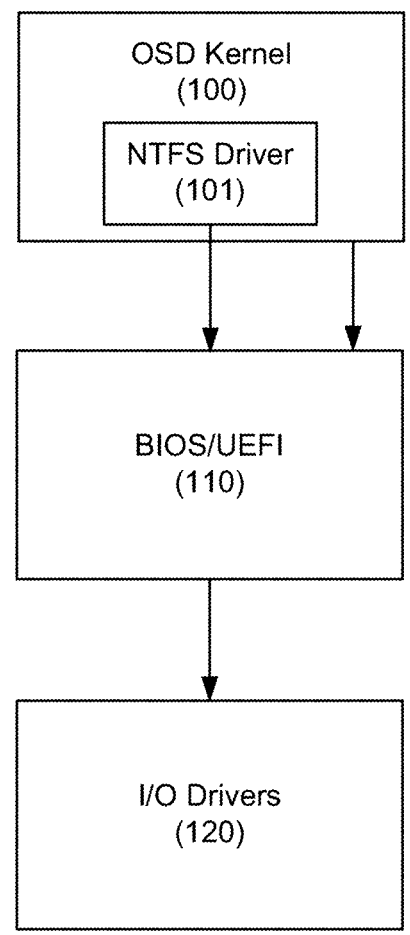
FIG. 1 is a diagram showing an illustrative interaction between an operating system deployment kernel and Input/Output (I/O) drivers executing I/O operations, according to one example of principles described herein.

As mentioned above, managing errors during an operating system deployment can be difficult. Monitoring for such errors often involves manual intervention from an administrator to remedy the error. This approach is problematic if the operating system is being deployed from a remote server and no administrator is nearby the target machine to remedy the error.

In light of this and other issues, the present specification describes methods and systems for handling an error in a remotely-controlled software installation on a target computing system. According to certain illustrative examples . . . .

Through use of systems and methods embodying principles described herein, efficient solution for handling errors in a remote Operating System (OS) deployment is realized. Furthermore, methods and systems embodying principles described herein can utilize inventory information sent to the server. Such inventory information may include, but is not limited to, hardware details, Basic Input Output System (BIOS) information, and Direct Access Storage Device (DASD) interface details. This information can help the server properly determine the appropriate remedial actions to take in response to particular errors or failures. Additionally, software hangs may be remedied. A software hang is when the computing system freezes up and is no longer able to accept commands from a user input device such as a keyboard or mouse. These hangs can be addressed by the server detecting out-of-band communication in the network cards to force a reboot. This can allow for the automatic recovery of the operating system deployment flow. The methods and systems embodying principles described herein allow for progressive discovery and dynamic handling of errors in response to detection of various failures.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As mentioned above, the methods and systems described herein involve deployment of an operating system to a target machine. The target machine may be any type of physical or virtual computer machine or system including, but not limited to, laptop computers, desktop computers, tablet computers, and mobile handheld computing devices.

The present invention may be applied to failure management in on-demand or real-time installations of enhanced browsers with client libraries, or hypervisors, or virtual machines, or a combination thereof. The operating system is typically loaded and executed from the system memory immediately after booting. Pre-operating system booting is used to boot up a computer system prior to the loading and execution of the operating system. The computer system capabilities are limited during the pre-operating system environment. Thus, there are limited computer resources available to monitor the deployment for errors or failures.

An operating system is a piece of software that manages the various hardware resources of a computing device. The operating system also manages several software applications and allows those applications to use the hardware resources of the computing device. Several different computing devices utilize operating systems including smart-phones, computers, handheld computers, desktop computers, laptops, supercomputers, video game consoles, robots, domestic appliances like dishwashers or washing machines, and portable media players. Operating systems offer a number of services to application programs and users. Applications access these services through application programming interfaces (APIs) or system calls.

The Basic Input/Output System (BIOS) is a standard boot firmware. The function of the BIOS is to identify, test, and initialize system devices such as the video display card, hard disk, floppy disk and other hardware. The BIOS prepares the machine for a known state, so that software stored on compatible media can be loaded, executed, and given control of the computer. Most of the time, BIOS programs are stored on a chip. Some components carry their own BIOS extension Read Only Memory (ROM), which provide additional functionalities. Operating systems and software supersede these basic functionalities and provide replacement software interfaces to applications. The BIOS of a computing system can be flashed. Flashing the BIOS refers to the process of overwriting the BIOS contents with a BIOS image. When the BIOS is flashed, it is updated to a newer version either to fix specific bugs, to support newer hardware, or to fix a damaged BIOS. If flashing the BIOS is not done correctly, it may render the system inoperable.

Extensible Firmware Interface (EFI) or Unified Extensible Firmware Interface (UEFI) is a specification that defines a software interface between an operating system and a platform firmware. EFI is a much larger, more complex, operating system-like replacement for the BIOS firmware interface present in computing systems.

The Preboot eXecution Environment (PXE) designates an environment to boot computers (clients or servers) using a network interface independently of available data storage devices (such as hard disks) or installed operating systems. The PXE makes use of several network protocols like Internet Protocol (IP), User Datagram Protocol (UDP), Dynamic Host Configuration Protocol (DHCP) and Trivial File Transfer Protocol (TFTP). The PXE also makes use of several concepts like Globally Unique Identifier (GUID), Universally Unique Identifier (UUID) and Universal Network Device Interface. The PXE extends the firmware of the PXE client, which is the computer to be bootstrapped via PXE, with a set of predefined Application Programming Interfaces (APIs). The term PXE client only refers to the role that the machine takes in the PXE boot process. A PXE client can be a server, desktop, laptop or any other machine that is equipped with PXE boot code.

Provisioning Manager refers to Provisioning manager systems such as TPMfDSD (Tivoli Provisioning Manager for Operating System Deployment). Tivoli is a trademark of IBM Corporation. While the description provides examples with TPMfDSD, it is to be understood that embodiments of the invention are not limited to this particular environment.

Systems for remotely managing operating system installation and deployment target machines often interact in an unattended way with the remote machine, through its BIOS, to load a pre-boot mini operating system environment (e.g. PXE over the network), transfer and prepare installable or restorable images, and then act on them. The result can be either a cloned machine or a specialization of a template machine. In all cases during the pre-boot phase, interactions occur with features and interfaces available in the target system BIOS.

For example, this can be accomplished using Tivoli Provisioning Manager for Operating System Deployment (TPM-fOSD). This system exposes features to install operating system images on a target machine by exploiting the PXE set of protocols. An operator generally binds hardware configuration tasks to the deployment of an operating system image. These configuration tasks are usually executed before the actual deployment of the operating system image in order to properly configure the machine firmware. Examples of such tasks include flashing or setting the BIOS.

A typical scenario for hardware configuration in TPM-fOSD includes the following steps. First, an administrator imports on the server the specific hardware toolkit. Second, an operator configures a task selecting the target machine. Third, upon issuing a hardware configuration task, the toolkit that matches the discovered hardware of the target machine and the task configuration settings are downloaded to the target machine.

The following additional steps are then executed by the target machine. First, the pre-execution environment is loaded into memory. This may be done as a Random Access Memory (RAM) disk. A RAM disk is a block of RAM that software treats as if it memory were a disk drive. A RAM disk is sometimes referred to as a virtual RAM drive or software RAM drive to distinguish its use of "primary storage" from a "hardware RAM drive" that uses separate hardware containing RAM. Any additional binary or configuration files are added to the RAM disk, based on the selection made via the web interface.

Next, the computer boots from the RAM disk. A hardware configuration task is then executed. The RAM disk then reboots and the deployment sequence is resumed, if any deployment sequence was selected. However, hardware configuration can also be run as a separate task.

For "desktop" and "laptop" environments, features to be managed for operating system deployment are stable because they appear to be a high level of standardization in this class of systems. The features are implemented from BIOS. When trying to address server class systems, several issues may arise due to high differentiations in the BIOS and low level software components. For example, there may be some instability and performance problems. The failure in managing this kind of interactions will manifest itself with a "hang" or continuous reboot. FIG. 1 illustrates interactions between an Operating System Deployment (OSD) Kernel (100) and Input/Output I/O drivers (120) needed to execute operations. As shown, the BIOS (110) and the pre-boot environment are operatively interacting. To execute an I/O operation, the OSD Kernel (100) places a call to the BIOS/UEFI (110) or to the internal New Technology File System (NTFS) driver (101). Alternatively, the NTFS Driver (101) may call to the BIOS/UEFI (110). The BIOS/UEFI (110) may then call the I/O Drivers (120). The I/O Drivers (120) may then implement the actual I/O operation.

Typically, "hang" or continuous reboot problems are handled by manually detecting and fixing the failing BIOS and by flashing BIOS updates on the target machines. This non-automated process lacks efficiency and can be extremely cumbersome. It may also require a specific version of the BIOS. It is not possible to manage such task as a standard software dependency. This is because the BIOS version that works on one target machine may not work on another target machine.

In light of this and other issues, the present specification discloses methods and systems for managing failures during operating system deployment. The principles described herein may be useful for complex and differentiated server class systems. However, methods and systems embodying principles described herein may be used on other types of operating system deployment systems as well. Many common failures from the hardware/firmware preparation and operating system installation steps are handled by exception, with a server side symptom catalogue, and are automatically remediated by triggering the most appropriate provisioning actions. These provisioning actions may include a BIOS flash or other firmware update or reconfiguration.

Figure 2:
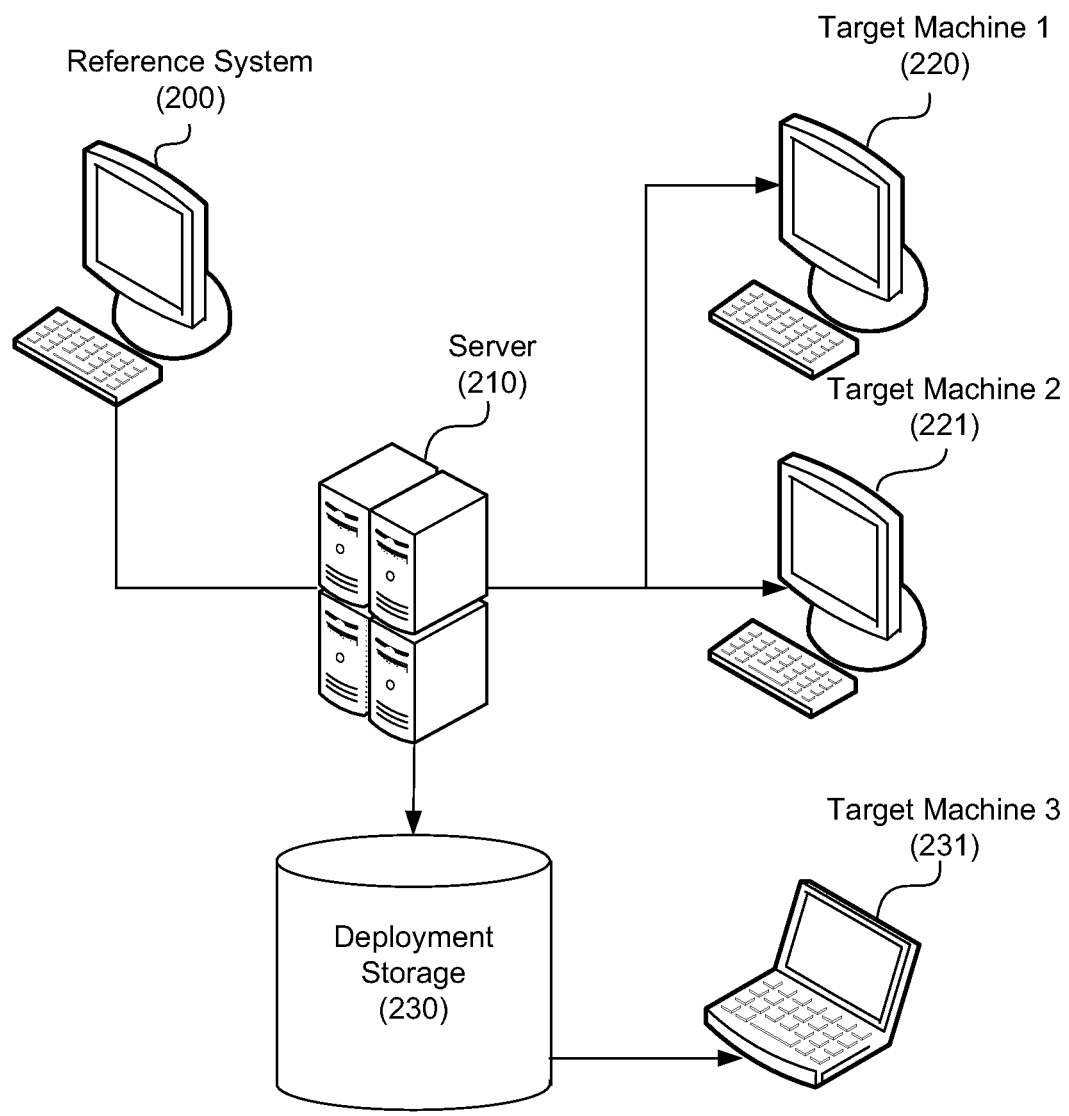
FIG. 2 is a diagram showing an illustrative architecture used to implement the operating system deployment, according to one example of principles described herein.

FIG. 2 illustrates deployment architecture for deploying an operating system to target machines. The deployment architecture includes a reference computer machine (200), an operating system deployment server (210), target machines (220, 221, 231), and deployment storage (230). The reference system is used for capturing an operating system image to use during the operating system deployment process and an operating deployment server (210) acting as a provisioning manager for operating system deployment.

The server (210) is provided to capture operating system images and deploy those operating system images to target computing systems. The server (210) also manages failures during the operating system deployment using inventory information related to a target machine and the information related to the detected failure. The server performs an operating deployment process in an online mode, i.e., through a network connection to target machine 1 (220) and target machine 2 (221).

The deployment storage (230) is an offline storage device 230, such as a Compact Disc (CD), Digital Versatile Disc (DVD), hard drive, or any other device suitable for storage on which the server (210) stores the operating system image it has previously cloned and prepared for deployment to a target machine (231) in an offline mode. Through deployment in an offline mode, no network connection is used. For example, the operating system image may be transferred to a CD. That CD may then be read by a CD drive in the target machine (231). From there, the operating system can be deployed.

The system components represented in FIG. 2 cooperate during the operating system cloning and deployment process. The operating system and software have been previously installed to the reference computer machine (200) which forms the reference operating system image. The reference operating system image will be the object of the operating system deployment operations performed by the operating system deployment server (210). The operating system deployment server (210) creates a clone reference operating system image from the reference computer machine (200) and stores this cloned image in its local storage. The image is then ready for use during an operating system deployment process. Alternatively, the server (210) also stores this cloned image on an offline storage device (230), such as a DVD or CD so that it is ready for use during an operating system deployment process.

The operating system deployment server (210) may support two types of operating system deployment. The first operating system deployment type is performed in an online mode and uses a direct network connection between the server (210) and the target machine (220, 221). In this online mode, the operating system deployment server (210) deploys the cloned reference operating system image directly on the target machine (220, 221).

The second operating system deployment type occurs in an offline mode wherein no network connection is used between the server (210) and the target machine (231). In this second type of operating system deployment, an operator or administrator uses the storage device (230) on which the cloned operating system image is stored and manually deploys the operating system on the target machine (231).

Figure 3:
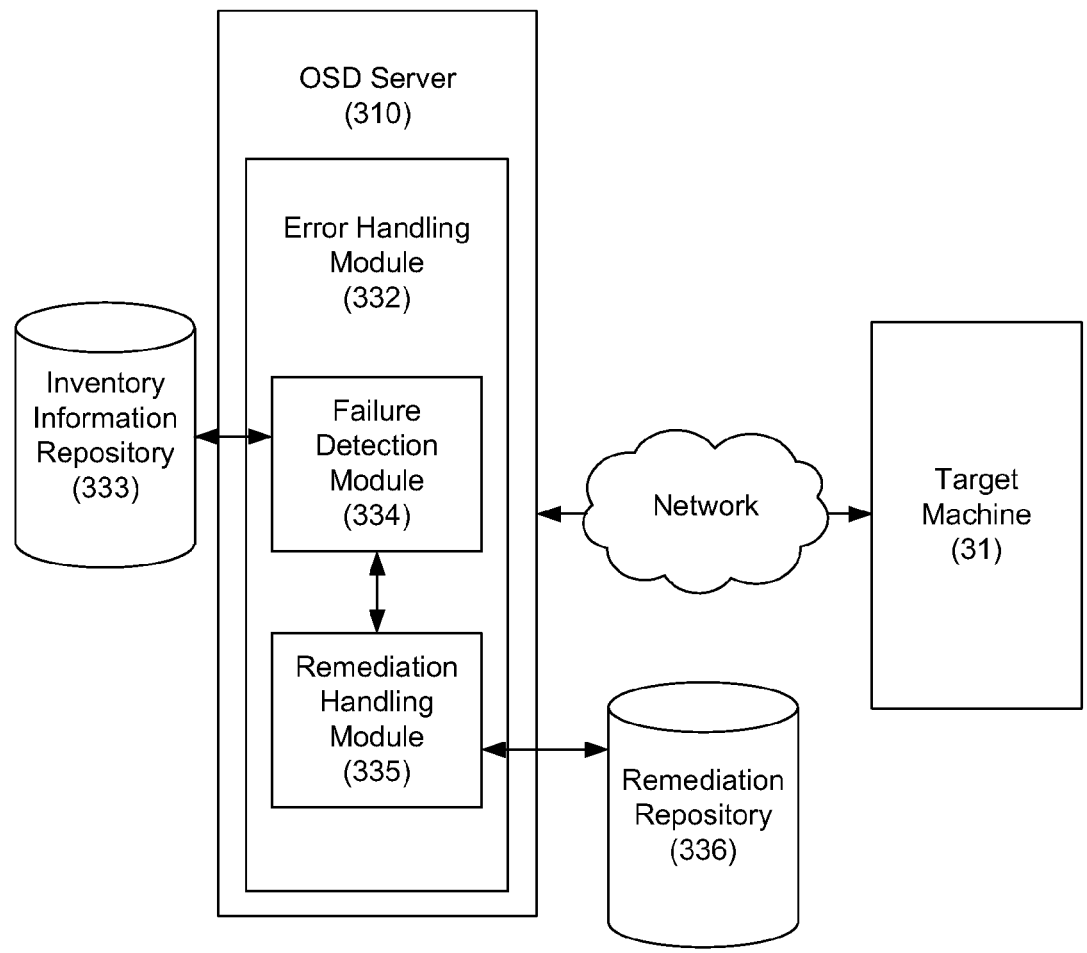
FIG. 3 is a diagram showing an illustrative failure management system, according to one example of principles described herein.

FIG. 3 illustrates a system for handling failures during operating system deployment. At any time, the operating system deployment server (310) may be signaled and informed of the ongoing state of the operating system deployment procedure. The server (310) may also be configured to receive a notification related to the result of each phase of the operating system deployment procedure (success notification, failure notification or other type of indicators).

According to certain illustrative examples, the operating system deployment server is provided with an error handling module (332). The error handling module (332) automatically manages failure notifications (target and server originated) using inventory information from an inventory information repository (333). The inventory information repository includes information obtained through a progressive hardware discovery of the target machine.

The hardware discovery (or hardware capture) captures hardware information related to the target machine at every PXE boot. The inventory information may include parameters related to the target machine that will be used to determine appropriate remediation actions in the event of a failure or error during the operating system deployment process. Such parameters may include Peripheral Component Interface (PCI) codes that can be used to identify the hardware machine when a failure is detected.

The error handling module (332) includes a failure detection module (334) for detecting failure during the operating system deployment and a remediation handling module (335) for triggering a remediation action in response to detection of an error. When an error is detected, the remediation handling module (335) searches a remediation repository (336) (also referred to hereinafter as an error catalogue) using the reported failure to retrieve an appropriate remediation action.

The remediation repository (336) associates remediation actions with failure codes and inventory information. For example, a particular type of failure code may indicate that a particular version of a BIOS should be flashed over the current version of the BIOS. The error handling module (332) is further adapted to control execution of the remediation action retrieved from the remediation repository (336). The remediation action may include a BIOS flashing action for the BIOS update or any other appropriate remediation action. Optionally, a test suite on the BIOS and driver interfaces may be run in the pre-operating system environment. This test suite may be run after the PXE boot and may help reduce failure occurrence during the deployment process.

Figure 4:
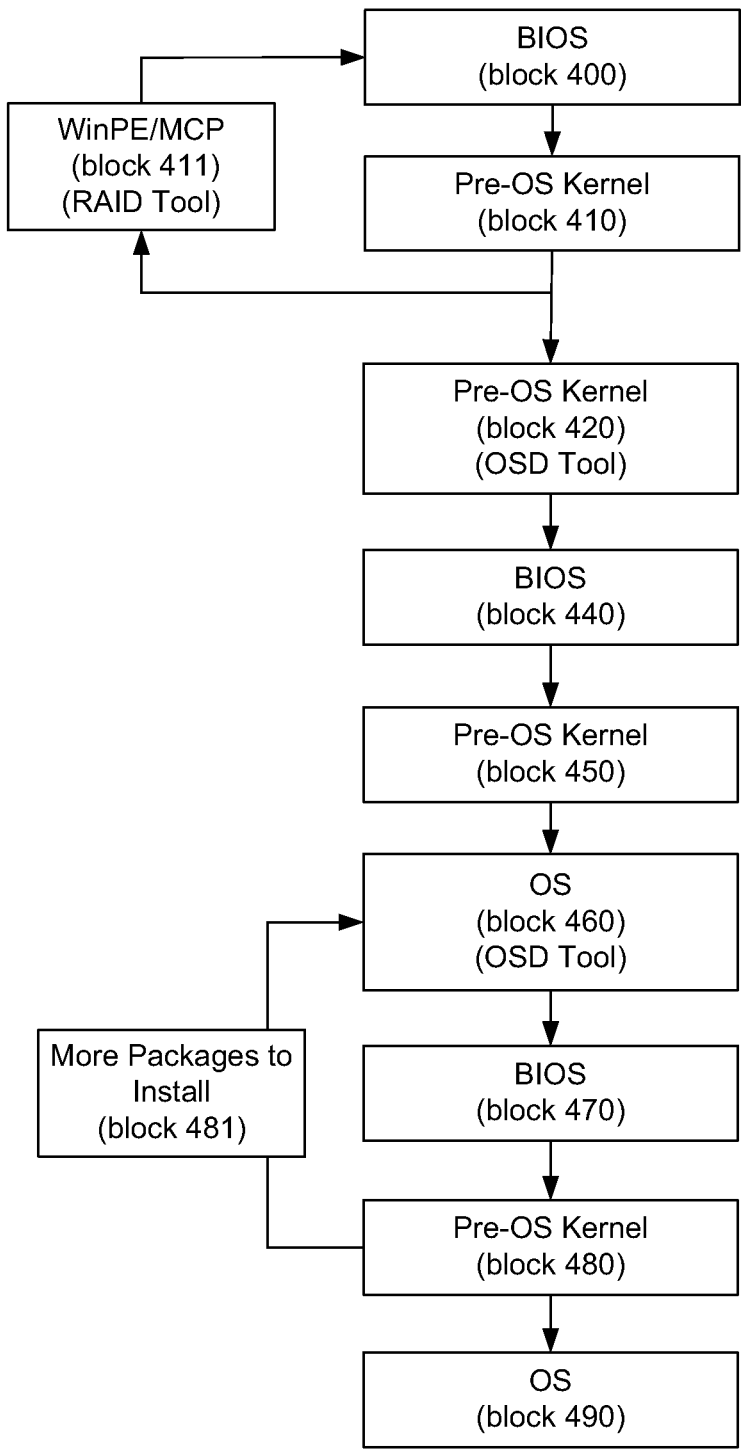
FIG. 4 is a flowchart showing an illustrative operation for operating system deployment, according to one example of principles described herein.

FIG. 4 is a flowchart for operating system deployment. At block 400, upon target machine activation, the control is passed to the BIOS for checking the boot sequence. The boot sequence is set to start from the network through the PXE protocol. The BIOS/PXE logic contacts the boot server and the pre-operating system kernel is downloaded and started on the target machine (e.g. 31, FIG. 3). At block 410, the pre-OS kernel performs a hardware discovery process and sends the inventory data obtained from that process back to the operating system deployment server (e.g. 310, FIG. 3). The inventory data received by the server is stored in the inventory information repository (333).

At block 410, a BIOS test suite is iteratively performed to detect failure during operating system deployment based on the inventory information maintained in the inventory repository (e.g. 333, FIG. 3). This process is described in more detail below within the text accompanying FIG. 6. The RAM disk is then downloaded from the operating system deployment server and started.

At block 411, hardware configuration tasks such as flashing or setting the BIOS may be executed. The tools that are used for configuring the hardware may be loaded and run on top of the RAM disk. At block 420, the operating system deployment agent runs on top of the RAM disk to perform partition creation and to copy of the files in the file system. The operating system deployment agent is loaded and run on top of RAM disk. Once those operations are completed, the RAM disk reboots.

At block 440, on reboot, the BIOS again takes control and repeats steps 400 to 420. At block 450, the pre-OS kernel checks if errors have happened in the previous phase. The pre-OS kernel then communicates any error to the operating system deployment server. It also checks for additional tasks that should be executed. The pre-OS kernel boots the operating system on the hard disk and also proceeds to set the operating system deployment agent to be run at startup.

At block 460, when the operating system boots, the operating system deployment tool starts and activates the specific operating system tool to customize the operating system. These customizations may include network configuration, user settings, and language settings. At block 470, upon rebooting, the BIOS again takes control and restarts the sequence at block 400. At block 480, the pre-OS kernel checks for failures and for any additional tasks that should be performed. The pre-OS kernel may also install additional optional packages. At block 490, if no other action is to be performed, the operating system is booted and started as normal.

Figure 5:
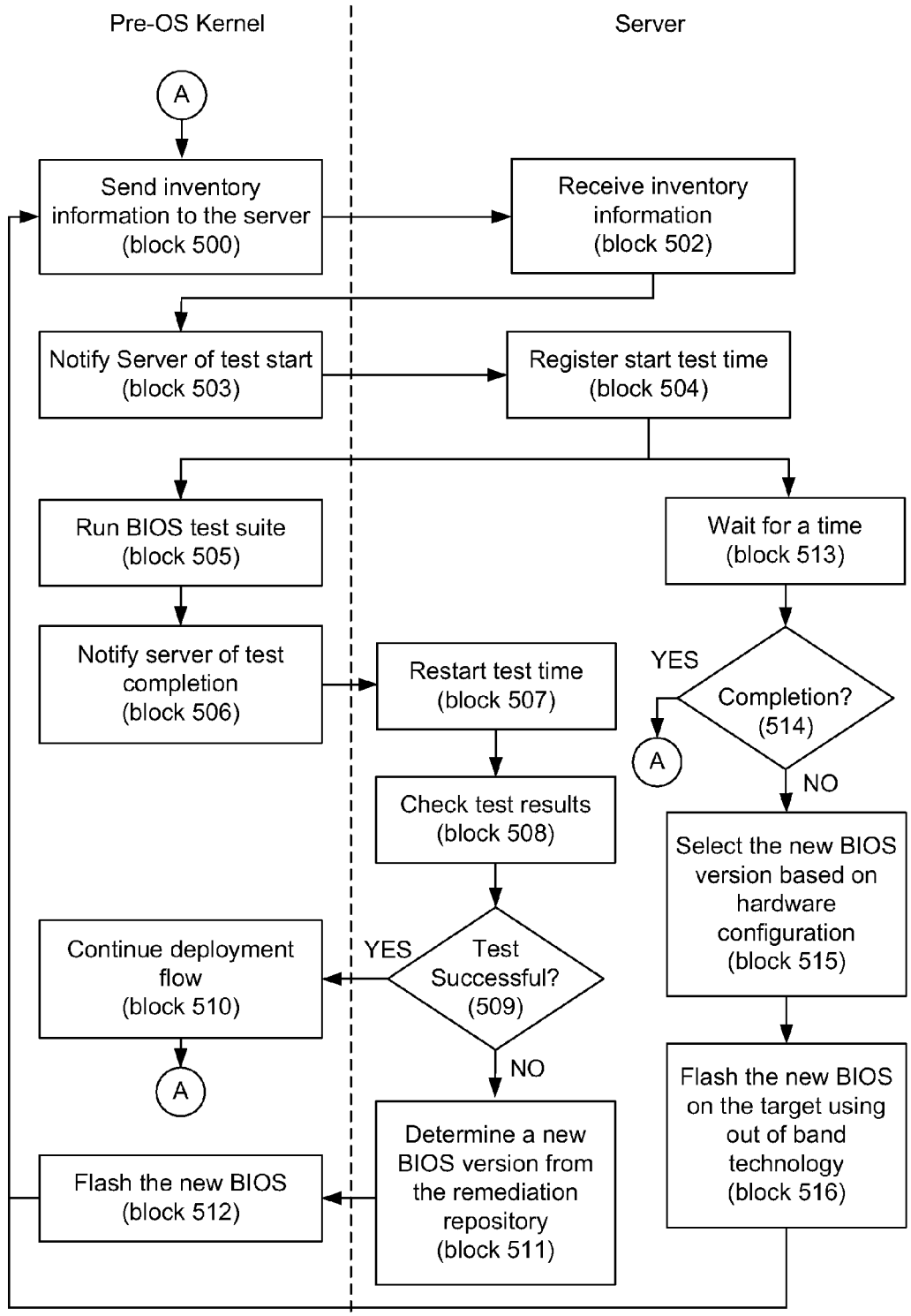
FIG. 5 is a flowchart showing an illustrative method for managing failure during operating system deployment.

FIG. 5 is a flowchart for failure monitoring and remediation during an operating system deployment. The left part of the flowchart represents the steps performed by the pre-OS kernel while the right part of the flowchart represents the steps performed by the operating system deployment server. The failure monitoring can be performed during the progressive hardware discovery phase of the pre-OS kernel.

The pre-OS kernel sends (block 500) inventory information discovered during hardware capturing to the operating system deployment server for storage. The inventory information is then received (block 502) by the server and stored thereon in the inventory information repository (e.g. 333, FIG. 3). A test suite is then initiated by notifying (block 503) the server of test start. In response to receiving the notification of the test start, the server registers (block 504) the test start time. The pre-OS kernel then runs (block 505) the BIOS test suite. In parallel, the server waits (block 506) for a predefined amount of time until the target machine is notified test completion.

When the pre-OS kernel notifies (block 506) the server of test completion, the server resets (block 507) the start test time and checks (block 508) the test results. The server then determines (block 509) whether the test was successful. If it is determined that the test was indeed successful (decision 509, YES), then the operating system deployment continues (block 510).

If it is determined that the test was not successful (decision 509, NO), then a new BIOS version is determined (block 511) from the remediation repository using the failure code generated as a result of the detected failure. If the remediation action involves flashing a new BIOS, then the new BIOS is then flashed (block 512), and the deployment flow is restarted by resuming at block 500.

If it is determined (decision 514, YES) that the server has received a completion notification before the predefined amount of time has expired, then the flow continues. If it is determined (decision 515, NO) that no test completion notification is received by the server after the predefined amount of time has expired, then the server determines that the target machine is in a hanging state. The server then selects (block 515) a new BIOS version depending on the hardware configuration. The server then flashes (block 516) the new BIOS on the target using out of band technology such as Active Management Technology (AMT). The machine is then rebooted, and the deployment flow is restarted by returning to block 500.

The invention thus provides an automatic and efficient method for handling failure during operating system deployment. This is done without manual action from a user or administrator. The error handling module uses information discovered during the hardware discovery to detect failure and determine the remedial action to perform on the failed target based on failure information. Flashing the BIOS is known as a risky operation that could render the target machine unusable. The invention further avoids such undesirable/inappropriate BIOS flashing operations, by automatically providing a remedial action in accordance with the detected failure and with inventory information progressively captured, by the updated BIOS versions, during hardware discovery.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. In particular it will be appreciated that the functionality of many of the components of FIGS. 4 and 5 may be implemented by means of software, hardware or firmware of any combination of these. In a high performance system a hardware implementation of the java execution may prove advantageous for example.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for managing operating system deployment failure, the method comprising:
    with an operating system deployment server, running an operating system deployment process that comprises running a progressive hardware discovery process of a target machine to which an operating system is deployed, said discovery process to capture inventory information related to said target machine;
    with the server, monitoring said operating system deployment to detect failure in a pre-operating system environment running on the target machine for a predefined period of time during said operating system deployment; and
    with the server, executing a remediation action in response to the target machine generating a failure code during said period of time, said remediation action related to a Basic Input Output System (BIOS) of said target machine; and
    with said operating system deployment server determining that said target machine is in a hang state if a completion notification is not received from said target machine within said predefined period of time;
    wherein determining said at least one remediation action comprises referring to a remediation repository associated with said operating deployment server and using a failure code.

2. The method of claim 1, further comprising, in response to determining that said target machine is in a hang state, select a new BIOS version based on hardware configuration determined through said progressive hardware discovery process.

3. The method of claim 2, wherein said at least one remediation action comprises flashing the new BIOS version on the target machine.

4. The method of claim 1, wherein said at least one remediation action further comprises forcing said target machine to reboot.

5. The method of claim 4, wherein forcing said target machine to reboot comprises using an out of band communication over a network that connects said operating system deployment server and said target machine.

6. The method of claim 1, wherein said at least one remediation action comprises reconfiguring firmware of said target machine.

7. The method of claim 1, wherein said inventory information comprises at least one of: hardware information, BIOS level information, or direct access storage device information.

8. A server system comprising:
    a processor; and
    a memory communicatively coupled to said processor;
    in which said processor is configured to:
        execute an operating system deployment process that comprises running a progressive hardware discovery process of a target machine to which an operating system is deployed, said discovery process to capture inventory information related to said target machine;
        monitor said operating system deployment to detect failure in a pre-operating system environment running on the target machine for a predefined period of time during said operating system deployment; and
        execute a remediation action in response to generation of a failure code by said target machine during said period of time, said remediation action related to a Basic Input Output System (BIOS) of said target machine;
    in which executing a remediation action comprises referring to a remediation repository associated with said server and, based on said failure code, selecting the remediation action related to a Basic Input Output System (BIOS) of said target machine.

9. The system of claim 8, wherein, in response to determining that said target machine is in a hang state, said processor is further configured to select a new BIOS version based on hardware configuration determined through said progressive hardware discovery process.

10. The system of claim 9, wherein said at least one remediation action comprises flashing the new BIOS version on the target machine.

11. The system of claim 8, wherein said at least one remediation action further comprises forcing said target machine to reboot.

12. The system of claim 11, wherein forcing said target machine to reboot comprises using an out of band communication over a network that connects said operating system deployment server and said target machine.

13. The system of claim 8, wherein said at least one remediation action comprises reconfiguring firmware of said target machine.

14. The system of claim 8, wherein said inventory information comprises at least one of: hardware information, BIOS level information, or direct access storage device information.

15. A computer program product for managing failure during operating system deployment, said computer program product comprising:
    a computer readable storage device having computer readable code embodied therewith, said computer readable program code comprising:
        computer readable program code configured to execute an operating system deployment process that comprises running a progressive hardware discovery process of a target machine to which an operating system is deployed, said discovery process to capture inventory information related to said target machine;

computer readable program code configured to monitor said operating system deployment to detect failure in a pre-operating system environment running on the target machine for a predefined period of time;

computer readable program code configured to execute a remediation action in response to said target machine generating a failure code during said period of time, said remediation action related to a Basic Input Output System (BIOS) of said target machine; and computer readable program code configured to associate remediation actions within a remediation repository with the generated failure code.

16. The computer program product of claim 15, wherein, in response to determining that said target machine is in a hang state, said computer readable program code is further configured to select a new BIOS version based on hardware configuration determined through said progressive hardware discovery process.

17. The computer program product of claim 16, wherein said at least one remediation action comprises flashing the new BIOS version on the target machine.

18. The computer program product of claim 15, wherein said at least one remediation action further comprises forcing said target machine to reboot.

19. The computer program product of claim 18, wherein forcing said target machine to reboot comprises using an out of band communication over a network that connects said operating system deployment server and said target machine.

20. A method for managing operating system deployment failure, the method comprising:

with an operating system deployment server, running an operating system deployment process that comprises running a progressive hardware discovery process of a target machine to which an operating system is deployed, said discovery process to capture inventory information related to said target machine;

monitoring said operating system deployment to detect failure in a pre-operating system environment running on the target machine for a predefined period of time during said operating system deployment, the target machine generating a failure code related to the Basic Input Output System (BIOS) of said target machine;

in response to detecting a failure, flashing a Basic Input Output System (BIOS) of said target machine with a new BIOS version, said new BIOS version obtained by using a failure code associated with said failure and said inventory information to lookup said new BIOS version in a remediation repository comprising a number of BIOS versions; and with said operating system deployment server determining that said target machine is in a hang state if a completion notification is not received from said target machine within said predefined period of time.

\* \* \* \* \*